Patented Apr. 18, 1950

2,504,579

UNITED STATES PATENT OFFICE 2,504,579

HYDRAULIC CEMENT COMPOSITION AND METHOD OF MAKING

John Perl, Los Angeles, Calif.

No Drawing. Application August 30, 1943,
Serial No. 500,555

5 Claims. (Cl. 106—93)

This invention relates to compositions of matter for the manufacture of building blocks, sheets, board and the like comprising principally mineral hydraulic binders as represented by Portland cements in which are included wood fiber such as sawdust, straw, reeds, rice hulls, nut shells and other plant fibers containing cellulose. The invention also relates to the process of making such building materials.

A general object of the invention is to combine cellulosic materials with hydraulic binders to produce stone-like products which will possess light weight and high insulation value, and will be capable of being cut with saws and nailed with ordinary nails without cracking. But a more important object is to produce such ligno-cement or other cement-cellulose products which will have high volume stability or resistance to expansion and contraction upon alternate wetting and drying, and will not show disintegration tendencies subsequent to normal setting.

Heretofore, when cellulosic materials have been combined in hydraulic cement compositions, they have first been treated with sodium hydroxide to remove substances which interfere with the setting properties of the cement. But, although retardation of setting of the cement has been thus avoided, nevertheless the resultant "soda cellulose" formed by reaction of the sodium hydroxide with the cellulose has possessed the objectionable properties of causing disintegration to set in after the cement products have set normally and of imparting poor volume stability to the cellulose cement products in that they have changed dimensions greatly upon wetting and drying due to consequent expansion and contraction respectively. This appears to be due to the fact that the "soda cellulose," which is water-soluble at least in part, hydrolyzes or "regenerates" at least partially in the presence of the water in the setting cement to produce amorphous cellulose, called "regenerated cellulose," which in turn is acted upon by liberated or regenerated sodium hydroxide and calcium hydroxide or the like in the cement to produce more "regeneratable cellulose" which likewise is "regenerated" or hydrolyzed by water. The term "regeneratable cellulose" is here applied to the alkali or soda cellulose because of its regeneration to the amorphous "regenerated" cellulose in the presence of water.

This "regenerated cellulose" I have found to cause set ligno-cement or other set cellulose-cement product to expand when wetted with water and to contract when drying takes place. This is a serious objection in building materials. The "regenerated cellulose" also produces the equally objectionable effect of causing the set product to deteriorate or disintegrate slowly after normal setting has occurred. The terms "soda cellulose," "regenerated cellulose" and "regeneratable cellulose," above defined as used in the present case, also are well understood in the cellulose treating arts. The phenomena involved are: Cellulose which may be represented by the formula $(C_6H_{10}O_5)_x$ reacts with sodium hydroxide (NaOH) to form soda cellulose represented by the formula: $C_6H_{10}O_5.4NaOH$. This is the "regeneratable cellulose" which is water-soluble and hydrolyzes to partial regeneration of amorphous cellulose to form "regenerated cellulose," thus: $(C_6H_{10}O_5)_{x-y}$, where $x$ signifies the number of molecules in the crystalline cellulose polymer and $y$ signifies the number of molecules split off from said polymer $x$; thus $x-y$ represents the extent of hydrolytic degradation due to regeneration. It will be noted that the "regenerated cellulose" has the same composition as the original cellulose. While the compounds are the same chemically, they are vastly different physically, in that the "regenerated cellulose" is amorphous in structure, whereas the original natural cellulose is commonly classified as of crystalline structure. Also, it is known in the art of "viscose-silk" manufacture (an artificial silk of "regenerated" cellulose type), that a regenerated cellulose has an affinity to condense with caustic soda three times greater than the original crystalline cellulose. While this theory appears to explain the phenomena here encountered, I do not wish to be necessarily bound thereby since the true explanation might be otherwise. In any event, the "regenerated cellulose" as the term is here defined is objectionable for the reasons above stated. Potassium hydroxide produces the equally objectionable "potash cellulose," another alkali cellulose.

I have discovered that cellulose materials can be treated to remove the substances therein which cause the setting action of the cement to be retarded, such as substances found in sawdust, while at the same time avoiding the formation of objectionable alkali cellulose or "regeneratable cellulose" so that no "regenerated cellulose" will form. In other words, the treated cellulosic material will be free from soda cellulose or potash cellulose or other regeneratable cellulose, and no "regenerated" or amorphous cellulose will form in the setting product to cause the objectionable expansion, contraction and subsequent disintegration mentioned.

These desirable results are preferably obtained by treating the sawdust, or other cellulosic material containing substances which retard the setting of the cement, with ammonia gas or ammonium hydroxide solution. These reactants do not have the objectionable type of caustic OH group which is found in sodium and potassium hydroxides and therefore do not form the objectionable "regeneratable" cellulose.

Briefly stated, the invention broadly resides in treating sawdust or similar cellulosic material with alkaline reagents which do not produce alkali cellulose or other "regeneratable cellulose" but nevertheless are capable of removing substantially all substances from the sawdust or kindred material which would interfere with the setting properties of hydraulic cement and would retard its setting. Otherwise stated, the invention resides also in cellulosic materials and in cemen-cellulose products such as ligno-cellulose prepared from sawdust and hydraulic cement, where the cellulosic materials have been treated to free them from substances which would retard the setting of the cement, the treated cellulosic materials at the same time being free from the described "regeneratable" or alkali celluloses and "regenerated" celluloses. In a preferred aspect the invention includes such materials and products where the cellulosic materials have been prepared by treatment with ammonia gas or vapors or ammonium hydroxide solution.

Cement products which have been made with sawdust treated as herein indicated have exhibited no observable expansion and contraction upon alternate wetting and drying, whereas building board made with Portland cement and sawdust treated with caustic soda solution have exhibited characteristically expansion of as much as one-sixteenth inch per lineal foot. Again, products made with sawdust according to the present invention have shown no tendency toward disintegration even after about three years; whereas corresponding products made with caustic soda-treated sawdust have shown a decline in strength within a few weeks after setting, and definite disintegration was in evidence within six or eight months.

Practice of the invention is relatively simple. Sawdust is the preferred cellulosic material because it is readily available in large quantities, is cheap, and is a good distender and insulating agent. Any apparatus for soaking the sawdust in the solution used with subsequent washing may be employed. Or if ammonia gas is used, then a storage chamber for the gas is required together with a closed treating chamber in which the sawdust is placed and into which the ammonia gas or vapors is introduced to the point of saturation of the sawdust, following which the resultant extract is drained off and passed to a vessel for recovery of the ammonia, the sawdust then being steamed and washed for further separation and recovery of the ammonia vapors. The treated sawdust may then be either dried for subsequent use, or mixed while still wet with Portland cement, and other ingredients if desired, in proportions to obtain a proper mix for forming into shapes desired and for subsequent setting.

When ammonia gas is employed, the sawdust usually naturally contains sufficient moisture for ammonia absorption to take place to an adequate extent. Otherwise steam may be introduced. Saturation and extraction is allowed to take place for about 30 minutes, or for other appropriate time readily determined according to batch size. The extract exudes from the sawdust and carries out substantially all the substances which would interfere with the subsequent setting of the cement with which the treated sawdust is mixed. Subsequent steaming followed by washing removes the remainder of the extract and liberates the ammonia which is recovered for further washing. Where ammonium hydroxide or other water solution is used, the sawdust is soaked in a solution of about 5% to about 15% concentration for about 30 minutes or other appropriate time determined for the size of the batch, whereupon the solution is drained off and the sawdust washed with water.

One particular procedure employed in practicing the invention with sawdust and hydraulic cement is as follows: Gaseous or vaporous ammonia from the steaming of previously ammonia-extracted sawdust (or from other sources) is passed into a closed container at around 100° F. to 200° F. and through a fresh charge of sawdust by which the ammonia is absorbed. Ordinarily the sawdust naturally provides sufficient moisture to combine with the ammonia vapors for producing a liquid extract which exudes from the sawdust. Otherwise sufficient steam may be introduced to supply the necessary moisture. The charge becomes completely saturated with ammonia and extract begins to drain from the sawdust in about 30 minutes, or somewhat longer according to the size of the batch. When saturation is complete and extract drainage commences, the charge is then steamed to cause all of the extract to drain from the sawdust and to cause all of the ammonia to be expelled from the sawdust. This may require an additional half hour, more or less according to the batch size. The ammonia vapors are led to a storage chamber for subsequent treatment of another batch of the cellulosic material.

When ammonia evolution ceases, the steamed batch is washed with water, preferably hot water, to remove all remaining extract. The wash water may be treated with alkali or milk of lime to liberate ammonia present which is returned to the cycle with previously liberated ammonia vapors.

These treatments remove all or substantially all of the substances in the sawdust or other raw cellulosic material which would retard setting of the cement subsequently used in preparing the artificial stone product. At the same time the described "regeneratable celluloses" are not formed.

The wet, treated cellulose is now ready to be combined with hydraulic cement such as the ordinary Portland cement and such other materials as may be desired. Enough cement is used to completely coat the treated sawdust or other treated cellulosic material and enough water is added to yield the desired consistency. To prepare the mixture for pressing into blocks only enough water will be employed to yield a mixture that would be termed "moist." For casting, a slurry is used such that, when a quantity is squeezed in the hand, only a slight amount of water oozes to the surface. Where the indicated amount of cement to coat the sawdust particles is used, a high insulating capacity is obtained by reason of the relatively large proportion of sawdust or other cellulose material.

Very desirable products possessing the properties heretofore stated, have been made from the following, both blocks and board having been produced therefrom:

|  | Parts by Weight | Parts by Volume |
|---|---|---|
| Wet treated sawdust | 100 | 100 |
| Portland Cement | 300 | about 50 |
| Inert mineral fillers | 0 to 150 | 0 to 100 |

Mineral fillers used may be diatomaceous earth, ground slate, talc, ground limestone, silica flour, pumice and the like, but they may be entirely omitted. Also the proportion of cement may be varied. Thus, as a general formula for the production of a "ligno-concrete" from treated sawdust and Portland cement, the following table indicates desirable ranges of the materials used:

|  | Parts by volume |
|---|---|
| Treated wet sawdust | 100 |
| Portland cement | 15 to 200 |
| Inert mineral filler | 0 to 85 |

As the cellulosic materials and the mineral fillers vary, those skilled in the art will readily understand that proportions may be varied somewhat to obtain the most suitable product for a given purpose. Therefore, it is obvious that variations may be made by such skilled persons within the scope of the appended claims. For insulating effects, the cement and filler will be insufficient to completely fill the voids in the sawdust.

I claim:

1. A composition comprising wood particles extracted with ammonia in solution in water to remove ammonia-soluble substances, and hydraulic cement coating said wood particles.

2. A process for preparing wood sawdust and other cellulosic materials to remove substances which would affect the setting of hydraulic cement mixed therewith in the presence of water, which comprises contacting the cellulosic material with ammonia gas in the presence of moisture to the point of saturation of the material and until extract exudes, washing out the extract and heating the material to expel the ammonia vapors, separating the wet extracted cellulose, mixing the wet sawdust materials with hydraulic cement, and shaping the mixture.

3. A composition of matter containing between about 15 parts and about 200 parts by volume of Portland cement and about 100 parts by volume of ligneous cellulosic particles extracted with an aqueous solution of ammonia to remove substances soluble therein which would interfere with setting of the cement, and washed with water to eliminate the extract.

4. A composition comprising ligneous cellulosic particles which have been extracted with an aqueous solution of ammonia to remove substances soluble therein, and Portland cement sufficient to coat the extracted particles and bind them together, but insufficient to completely fill the voids between the particles.

5. A composition as in claim 3 wherein the extracted particles are extracted wood particles such as wood sawdust.

JOHN PERL.

REFERENCES CITED

The following references are of record in the file of this patent:

UNITED STATES PATENTS

| Number | Name | Date |
|---|---|---|
| 256,436 | Klimisch | Apr. 11, 1882 |
| 1,016,178 | Sammet | Jan. 30, 1912 |
| 1,153,883 | Arledter | Sept. 21, 1915 |
| 1,259,502 | Farr | Mar. 19, 1918 |
| 1,471,876 | Zukoski | Oct. 23, 1923 |
| 1,802,715 | Hixon | Apr. 28, 1931 |

FOREIGN PATENTS

| Number | Country | Date |
|---|---|---|
| 155,268 | Great Britain | 1922 |
| 321,744 | Great Britain | 1929 |
| 396,652 | Great Britain | 1933 |
| 453,905 | Great Britain | 1936 |
| 476,999 | Great Britain | 1937 |